US012626085B1

(12) United States Patent
Scruggs

(10) Patent No.: US 12,626,085 B1
(45) Date of Patent: **\*May 12, 2026**

(54) METHOD OF INTERLAYING A METAL CORE FOR A DUAL-LAYER ELECTRONIC METAL CARD

(71) Applicant: InterActive Cards, Inc., Lakeland, FL (US)

(72) Inventor: Michael Scruggs, Lakeland, FL (US)

(73) Assignee: InterActive Cards, Inc., Lakeland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/193,135

(22) Filed: Apr. 29, 2025

Related U.S. Application Data

(63) Continuation of application No. 18/749,038, filed on Jun. 20, 2024, now Pat. No. 12,288,117.

(60) Provisional application No. 63/522,768, filed on Jun. 23, 2023.

(51) Int. Cl.
*G06K 19/077* (2006.01)
*B32B 9/04* (2006.01)
*B32B 37/12* (2006.01)

(52) U.S. Cl.
CPC ........ *G06K 19/07722* (2013.01); *B32B 9/041* (2013.01); *B32B 37/1207* (2013.01); *B32B 2309/12* (2013.01); *B32B 2425/00* (2013.01)

(58) Field of Classification Search
None
See application file for complete search history.

(56) References Cited

U.S. PATENT DOCUMENTS 12,288,117 B1 * 4/2025 Scruggs .............. B32B 37/1207

* cited by examiner

*Primary Examiner* — Kristy A Haupt
(74) *Attorney, Agent, or Firm* — Andrew Behrens; Trenam Law

(57) ABSTRACT

A method of interlaying a metal core for a dual-layer electronic metal payment card. The metal core includes a metal layer having one or more openings formed therein (such as to receive a payment module or another electronic component or aesthetic feature). To interlay the metal core, the metal layer is laminated with a heat activated film layer and a release liner, and the laminated structure is subsequently placed on a heating plate. A polymer is applied only to the one or more openings. Using a containment structure placed over the metal core layer and a combination of heat, vacuum pressure, and pressurized inert gas, the method includes adhering and curing the polymer to the heat activated film to complete the lamination process. After curing, excess polymer is removed via a finishing edge (such as a grinder, a sander, a milling machine, or as similar edge).

20 Claims, 6 Drawing Sheets

METHOD OF INTERLAYING A METAL CORE FOR A DUAL-LAYER ELECTRONIC METAL CARD

CROSS-REFERENCE TO RELATED APPLICATIONS

This nonprovisional application is a continuation of and claims priority to nonprovisional application Ser. No. 18/749,038, entitled "Method of Interlaying a Metal Core for a Dual-Layer Electronic Metal Card," filed Jun. 20, 2024 by the same inventor(s), which claims priority to provisional application No. 63/522,768, entitled "Method of Interlaying a Metal Core for a Dual-Layer Electronic Metal Card," filed Jun. 23, 2023 by the same inventor(s).

BACKGROUND OF THE INVENTION

1. Field of the Invention

This invention relates, generally, to electronic cards, particularly to electronic metal cards. More specifically, it relates to a method of creating a metal core for a dual-layer electronic metal payment card that improves card integrity and longevity while minimizing material requirements.

2. Brief Description of the Prior Art

In recent years, metal payment cards have gained popularity within the electronic payment card industry, with many consumers preferring metal cards to polymer-based cards. In addition, payment cards increasingly include payment modules, other electronic components, or aesthetic features beyond a simple magnetic payment strip. The increased complexity in the design and function of payment cards has resulted in the need to modify manufacturing processes for payment cards. For example, payment cards including payment modules require the insertion of such payment modules into a core of the payment cards. As such, the payment card must include an aperture or indentation to receive the payment module therein.

However, such complex multi-component designs impact the integrity and longevity of the payment cards, as compared to traditional magnetic strip-based cards. For example, many cards require a primer (such as a polyethylene terephthalate, or PET, film with an opposing adhesive layer) to bond a card, but the complex layers result in a card that is thicker than desired, and include a vast amount of waste materials. Attempts have been made to use a thinner coating to minimize card thickness, but many thinner coatings do not function properly and often require replacement cards. For example, liquid primers have been used for bonding and lamination of metal cores; while the resulting card is sufficiently thin, at times, the outer layers can delaminate at high temperatures and humidities. In addition, the use of a primer or coating can reduce the percentage of metal in a finished payment card due to the extra bonding materials within the card's core. A lower metallic composition percentage can reduce the weight of the payment card and can alter tactile and audial properties associated with the card.

Accordingly, what is needed is an improved method of interlaying a metal core for a dual-layer electronic metal payment card to maximize card integrity and longevity while minimizing material requirements. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies, and the definition of that term in the reference does not apply.

While certain aspects of conventional technologies have been discussed to facilitate disclosure of the invention, Applicant in no way disclaims these technical aspects. It is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a method of creating a metal core for a dual-layer electronic metal payment card is now met by a new, useful, and nonobvious invention.

The novel method includes a step of overlaying a metal layer to a film layer. The metal layer has a length and width generally equal to a length and width of the film layer. The metal layer also defines at least one aperture, such that the film layer and the at least one aperture form a pocket. The metal layer and film layer together form a pre-laminated structure. The pre-laminated structure is placed onto a heating plate. The heating plate defines at least one channel therethrough, such that the at least one channel does not align with the at least one aperture defined by the metal layer. An amount of heat is applied to the pre-laminated structure via the heating plate. In an embodiment, the method includes a step of applying, through the at least one channel, a negative pressure to secure the pre-laminated structure to the heating plate.

Some embodiments includes a release liner secured to a surface of the film layer that is opposite the surface to which the metal layer is secured. In such embodiment, the film layer is disposed between the metal layer and the release liner The pocket formed by the film layer and the at least one aperture is selectively filled with an amount of polymer without coating an entire top surface of the metal layer. The amount of polymer that fills the pocket has a volume greater than a volume of the pocket. The amount of polymer is subsequently cured. Via a finishing edge, an excess amount of polymer is removed from the laminated structure. Specifically, the method includes the steps of disposing the finishing edge proximate to a top surface of the metal layer and laterally translating the finishing edge along the top surface of the metal layer. The excess amount of polymer resides above the top surface of the metal layer. After removing the excess mount of polymer, a metal core with at least one filled aperture is formed. In an embodiment, the at least one filled aperture includes a height of between approximately 0.00015 inches and 0.0003 inches above a top surface of the metal core. In some cases, the finished height of the polymer could be up to 0.001 inches above the top surface of the metal layer.

In an embodiment, the method includes a step of applying a containment structure to the heating plate. The containment structure and the heating plate encase the pre-laminated structure therein, such that a void is defined between the pre-laminated structure and the containment structure. An embodiment of the method includes removing bubbles formed within the amount of polymer by applying a negative pressure within the void. In an embodiment of the method, a volume of bubbles formed within the amount of polymer is reduced by applying a pressurized inert gas within the void. The combination of applying the amount of heat via the heating plate and applying the pressurized inert gas within the void synergistically cure and adhere the amount of polymer to the film layer within the at least one aperture.

In some embodiments, the film layer is comprised of a heat activated cross-linking material. In some embodiments, the film layer has a thickness of between approximately 0.0005 and 0.005 inches. In some embodiments, the metal layer has a thickness of between approximately 0.005 and 0.030 inches.

The present invention also includes a metal core for a dual-layer electronic metal payment card. The metal core includes a metal layer laminated to a film layer. The metal layer has a length and width generally equal to a length and width of the film layer. The metal layer further includes at least one aperture, such that the film layer and the at least one aperture form a pocket. A cured polymer is selectively disposed within the pocket and not about the top surface of the metal layer. The amount of polymer in the pocket is greater than a volume of the pocket resulting in an excess amount of polymer residing above a top surface of the metal layer.

In some embodiments, the film layer is comprised of a heat activated cross-linking material. In some embodiments, the film layer has a thickness of between approximately 0.0005 and 0.005 inches. In some embodiments, the metal layer has a thickness of between approximately 0.005 and 0.030 inches.

An object of the invention is to improve a longevity and an integrity of an electronic metal payment card. Another object of the invention is to reduce total material requirements for interlaying a metal core for an electronic metal payment card.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
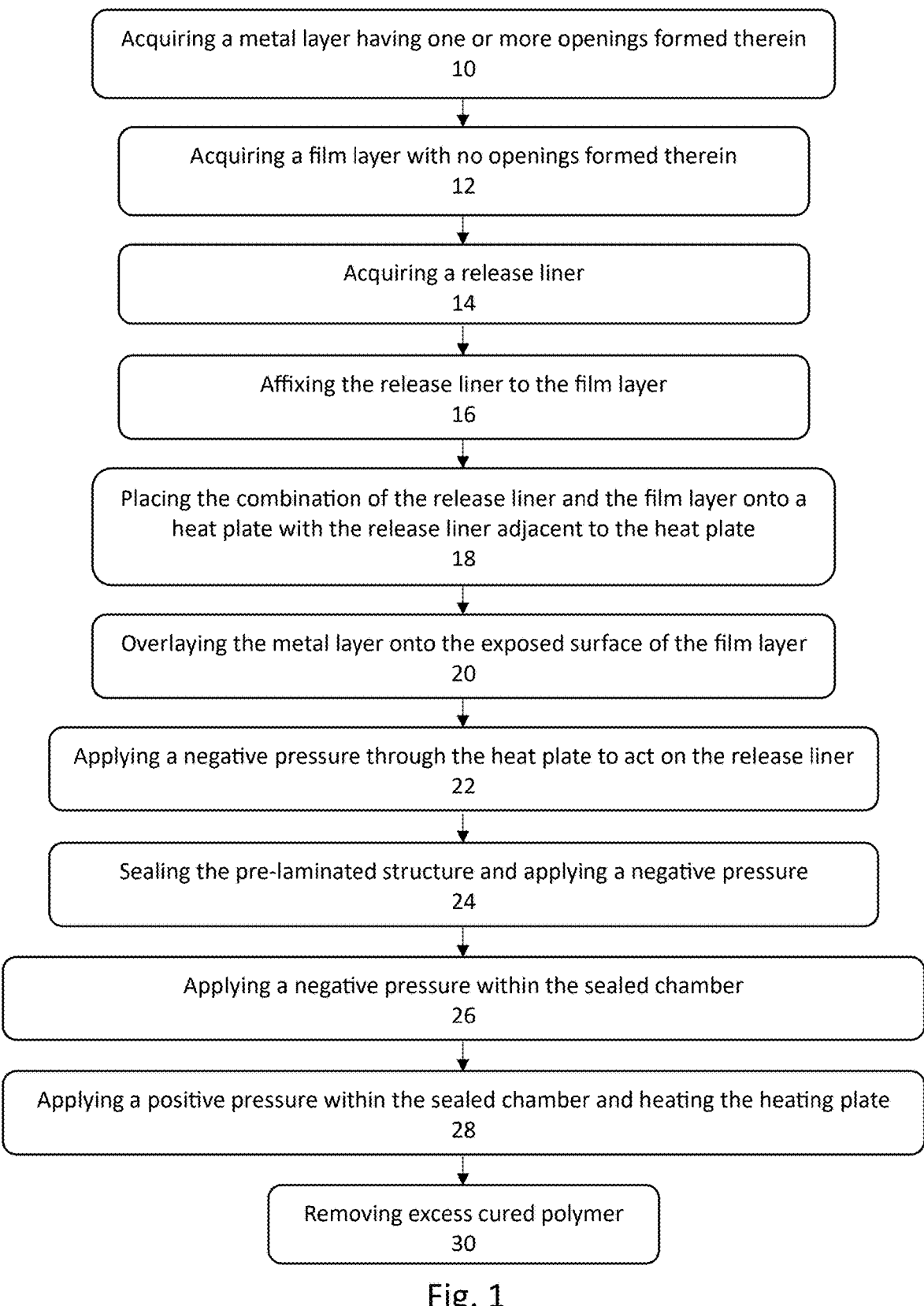
FIG. 1 is a flowchart of an embodiment of the present invention.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

All numerical designations, such as measurements, efficacies, physical characteristics, forces, and other designations, including ranges, are approximations which are varied up or down by increments of 1.0 or 0.1, as appropriate. It is to be understood, even if it is not always explicitly stated that all numerical designations are preceded by the term "about." As used herein, "about" or "approximately" refers to being within an acceptable error range for the particular value as determined by one of ordinary skill in the art, which will depend in part on how the value is measured or determined. As used herein, the term "about" refers to ±15% of the numerical; it should be understood that a numerical including an associated range with a lower boundary of greater than zero must be a non-zero numerical, and the term "about" should be understood to include only non-zero values in such scenarios.

The present invention includes a method of interlaying a metal core for a dual-layer electronic metal payment card. The metal core includes a metal layer having one or more openings formed therein (such as to receive a payment module or another electronic component or aesthetic feature). The metal core layer also includes a heat activated film layer, a release liner, and a polymer (such as a resin) to fill the openings. To interlay the metal core, the metal layer is laminated with the heat activated film layer and release liner and subsequently placed on a heating plate, and the polymer is applied to the one or more openings. Using a containment structure placed over the metal core layer and a combination of heat, vacuum pressure, and pressurized inert gas, the method includes adhering and curing the polymer to the heat activated film to complete the lamination process. After curing, excess polymer is removed via a finishing edge (such as a grinder, a sander, a milling machine, or a similar edge). The method of interlaying a metal core for a dual-layer electronic metal payment card will be described in greater detail below.

As shown, an embodiment of the method of manufacturing a metal core for assembling a dual-layer electronic metal payment card starts with acquiring a metal layer having one or more openings formed therein at step 10. An embodiment of the metal layer is exemplified in FIG. 2. As depicted, metal layer 110 includes at least one aperture 112 defined therein with the at least one aperture 112 extending from a top surface of metal layer 110 to a bottom surface of metal layer 110. In some embodiments, a plurality of apertures 112 are defined by metal layer 110. In addition, at least one aperture 112 may be asymmetrical in its defined shape and may include a defined slit 114 extending the at least one aperture 112 in a direction toward an edge of metal layer 110. The at least one aperture 112 and defined slit 114 are configured to receive a payment module (such as for contactless transactions), another electrical component (such as a transmitter receiver or transceiver for contactless access to a restricted space), or an aesthetic feature of the dual-layer electronic metal payment card. Moreover, in some embodiments the defined slit 114 is configured to enable the metal to act as a communication component such as an antenna or other transmitter receiver or transceiver.

Metal layer 110 may further include a predetermined thickness between its top and bottom surfaces. In some embodiments, the predetermined thickness is between approximately 0.005 and 0.030 inches.

Figure 2:
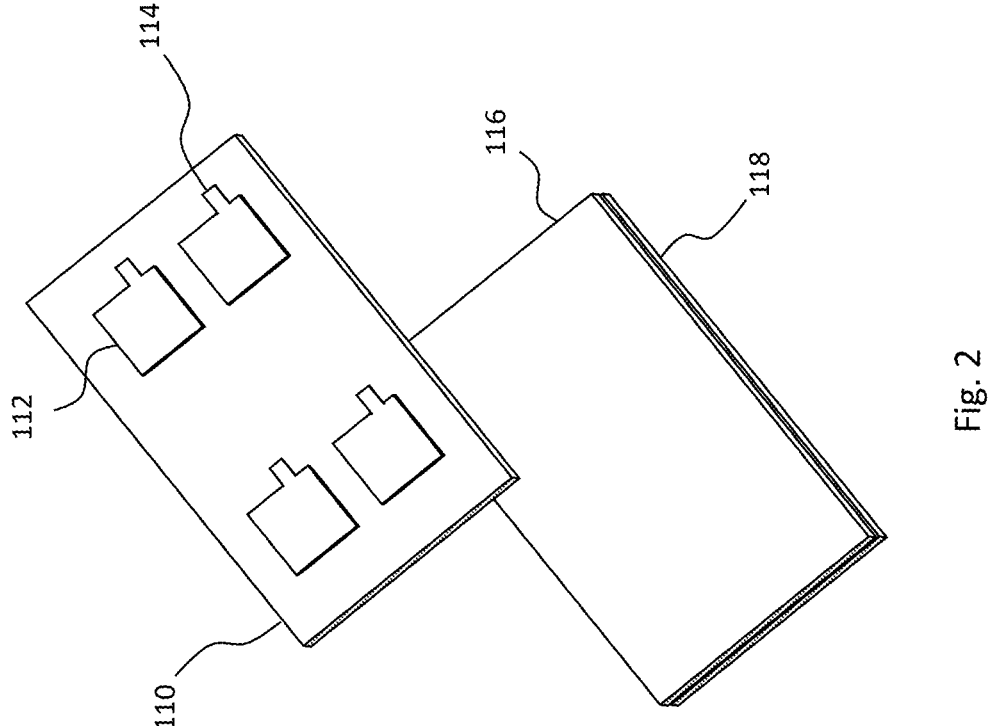
FIG. 2 is a perspective view of a metal core of an electronic metal payment card, in accordance with an embodiment of the present invention.

Referring back to FIG. 1, the method of the present invention includes acquiring a film layer at step 12. Turning to FIG. 2, an embodiment of the film layer is exemplified by layer 116. As depicted, film layer 116 includes a planar and continuous top surface such that there are no apertures through-holes or channels defined through a body of film layer 116. As such when metal layer 110 is laminated to film layer 116, film layer 116 forms a bottom surface below the at least one aperture 112 in metal layer 110 as will be described in greater detail below. Moreover, when metal layer 110 is laminated to film 116, film layer 116 forms an intermediary layer between metal layer 110 and release liner 118.

In some embodiments, film layer 116 has the same width and length as metal layer 110 to ensure that film layer 116 adheres to one of the planar surfaces of metal layer 110. In some cases, film layer 116 includes a predetermined thickness between its top and bottom surfaces. In some embodiments, the predetermined thickness is between approximately 0.0005 and 0.005 inches.

Film layer 116 is intended to remain on metal layer 110 as a permanent layer. To do so, some embodiments of film layer 116 are comprised of a heat activated laminate material. Moreover, film layer 116 may be comprised of a material that cross links under heating and cannot be melted again to ensure that film layer 116 remains affixed to metal layer 110. Film layer 116 also has a required peel strength to meet ISO standards and environmental standards for fixturing as well. For example, greater than 5N/cm.

Referring back to FIG. 1, the method of the present invention further includes the acquisition of release liner 14 in some embodiments. In some embodiments, the release liner and the film layer are preassembled and thus steps 12 and 14 occur simultaneously.

Turning to FIG. 2, an embodiment of the film layer is exemplified by layer 118. As depicted, release liner 118 includes a planar and continuous top surface such that there are no apertures through-holes or channels defined through a body of release liner 118. As such, release liner 118 creates a protective barrier on film layer 116.

In some embodiments, release liner 118 has the same width and length as metal layer 110 and film layer 116 to ensure that release liner 118 adheres to a planar surface of film layer 116 without any wasted material. In some cases, release liner 118 includes a predetermined thickness between its top and bottom surfaces. In some embodiments, the predetermined thickness is between approximately 0.002 and 0.010 inches.

Release liner 118 is a sacrificial layer that stays on film layer 116 during transport to prevent damage to film layer 116. Release liner 118 may be comprised of a polypropylene with silicone pressure adhesive.

Referring back to FIG. 1, steps 10, 12, and 14 of the method can be performed in a different order or simultaneously without departing from the scope of the invention. For instance, steps 10, 12, and 14 can be executed concurrently to streamline the process and improve efficiency. Alternatively, one or two steps can be carried out after another step to allow for better integration of subsequent operations. The flexibility in the sequence of these steps ensures that the method can be adapted to various operational requirements and constraints, thus providing versatility in its application. This adaptability underscores the robustness of the method, accommodating different procedural workflows while maintaining the integrity and effectiveness of the overall process.

As noted above, in some embodiments release liner 118 is already affixed to film layer 116. However, in some embodiments, film layer 116 needs to be affixed to release liner 118, which is depicted as step 16 in FIG. 1. Step 16 may be performed at any location. However, in some embodiments, step 16 occurs after release liner 118 is placed onto heat plate 122 with release liner 118 in contact with a top surface of heat plate 122.

Alternatively, release liner 118 is already affixed to film layer 116 when the combination of release liner 118 and film layer 116 are placed onto a top surface of heat plate 122 with release liner 118 residing between film layer 116 and heat plate 122. This alternative option is depicted in FIG. 1 as step 18.

Once film layer 116 is affixed to release liner 118, the method further includes overlaying metal layer 110 onto heat activated film layer 116 at step 20 to create pre-laminated structure 120. Metal layer 110 overlays the exposed surface of film layer 116 while protective release liner 118 is affixed to an opposite surface thereof (such as a bottom surface of film layer 116 with metal layer 110 overlayed onto a top surface of film layer 116). In some cases, metal layer 110 is oriented such that the front surface of metal layer 110 is the surface to which film layer 116 is laminated.

Like step 16, step 20 may be performed at any location. However, FIG. 1 depicts step 20 occurring after release liner 118 and affixed film layer 116 are placed onto heat plate 122 with release liner 118 in contact with a top surface of heat plate 122, so that film layer 116 remains exposed and available to receive metal layer 110 in overlying relation.

Figure 3B:
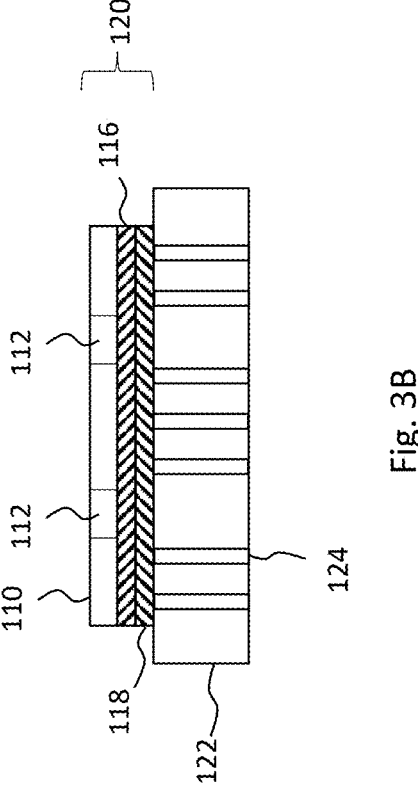
FIG. 3B is a section view (along section line 3B of FIG. 3A) of the metal core of the electronic payment card and a heated platform shown in FIG. 3A, in accordance with an embodiment of the present invention.
Figure 3A:
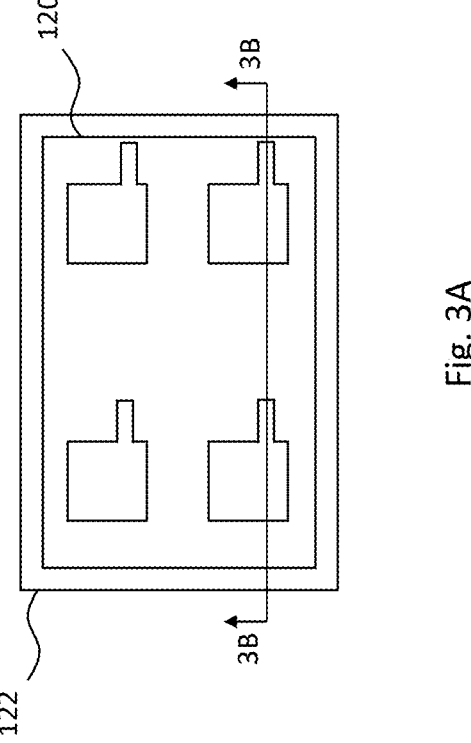
FIG. 3A is a top plan view of a metal core of an electronic payment card, in accordance with an embodiment of the present invention.
Figure 4:
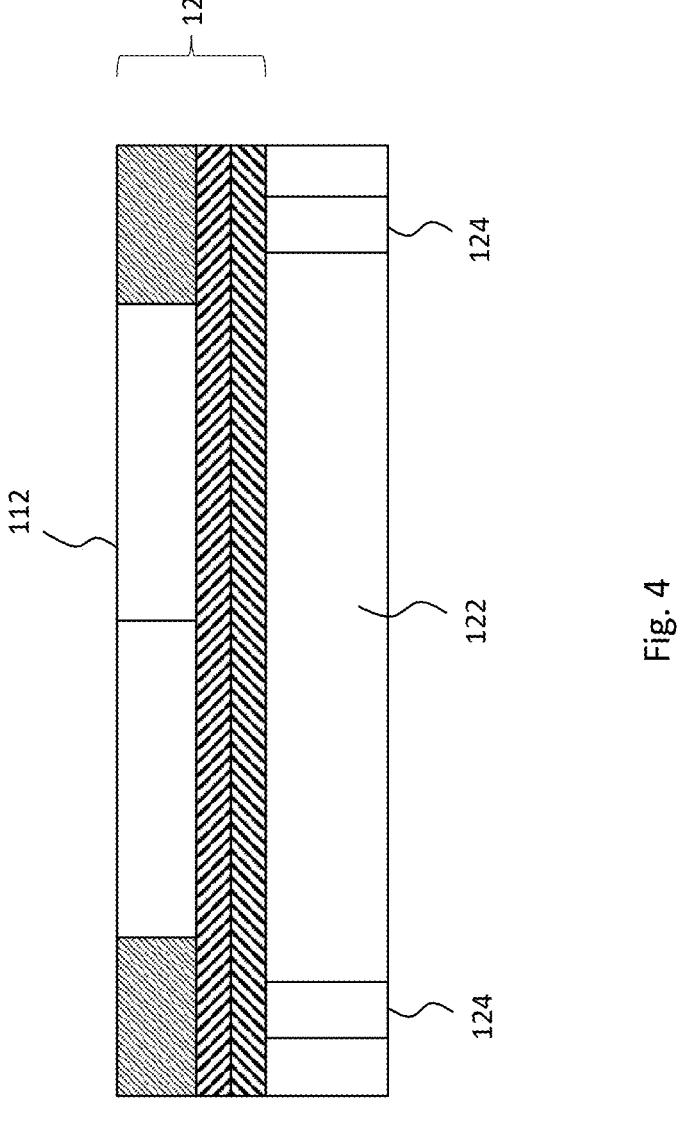
FIG. 4 is a close-up section view of the metal core and the heated platform of FIG. 3B, in accordance with an embodiment of the present invention.

Turning to FIGS. 3A-3B and 4, pre-laminated structure 120 is shown in greater detail with pre-laminated structure 120 including metal layer 110, film layer 116, and release liner 118 (as shown in particular in FIG. 3B which is a section view taken along line 3B of FIG. 3A). Pre-laminated structure 120 is disposed on heating plate 122 which includes a planar top surface such that the planar top surface of heating plate 122 receives release liner 118 of pre-laminated structure. Heating plate 122 also defines at least one channel 124 disposed therethrough with the at least one channel 124 spanning from the planar top surface of heating plate 122 to an opposing bottom surface of heating plate 122 such that each of the planar top surface and the bottom surface of heating plate 122 is discontinuous to define the at least one channel 124. As shown in FIG. 3B, in an embodiment, heating plate 122 defines a plurality of channels 124.

Pre-laminated structure 120 is placed on heating plate 122 such that the at least one channel 124 (or each of the plurality of channels 124 in the presence of multiple channels) defined by heating plate 122 is aligned with a body portion of metal layer 110. Put another way, the at least one channel 124 does not align with the at least one aperture 112 defined by metal layer 110 to avoid deforming the bottom surface of the pocket formed by film layer 116.

Referring back to FIG. 1, at step 22, an amount of negative pressure (such as vacuum pressure) is applied to pre-laminated structure 120 through the at least one channel 124. Under negative pressure pre-laminated structure 120 (via release liner 118) is secured against heating plate 122 such that pre-laminated structure 120 and heating plate 122 are coplanar with and parallel to each other.

Figure 5:
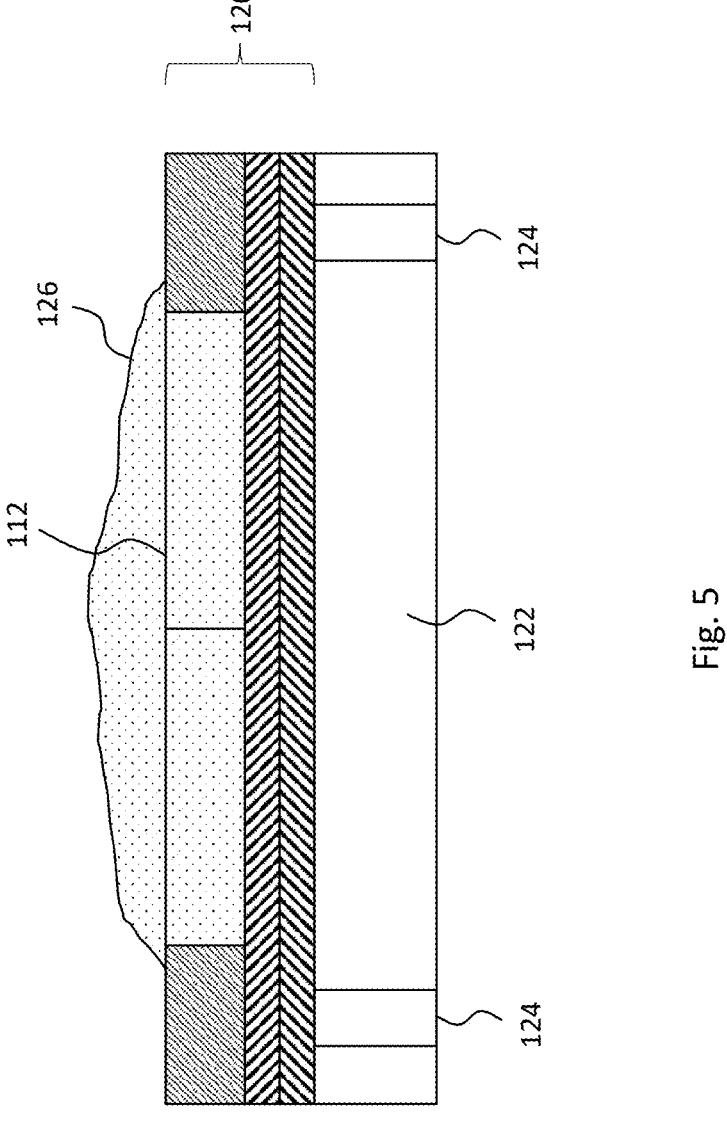
FIG. 5 is a close-up section view of the metal core and the heated platform of FIG. 4 including a coating layer, in accordance with an embodiment of the present invention.

Referring to FIGS. 1 and 5 after placing pre-laminated structure 120 on heating plate 122, an amount of polymer 126 (such as a two-part resin) is applied directly to the exposed portion of film layer 116 through the aperture(s) 112 in metal layer 110 at step 24 without coating the entire top surface of the metal layer. Specifically, the amount of polymer 126 is applied directly to the portion of film layer 116 that forms the bottom surface defining the at least one aperture 112 within pre-laminated structure 120. The amount of polymer 126 applied to fill each aperture 112 includes a volume that is greater than a volume of each aperture 112 such that the amount of polymer 126 entirely fills each aperture 112 and extends above the top surface of metal layer 110.

Figure 6:
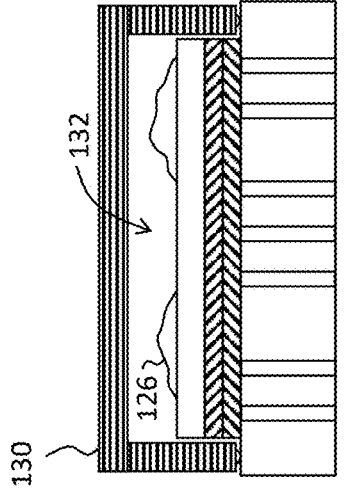
FIG. 6 is a section view of the metal core and heated platform of FIG. 3B and of a containment structure, in accordance with an embodiment of the present invention.

Turning to FIGS. 1 and 6, after filling the at least one aperture 112 with the amount of polymer 126, containment structure 130 is secured to heating plate 122 and over pre-laminated structure 120 such that containment structure 130 is spaced apart from pre-laminated structure 120 forming a sealed void 132 between containment structure 130 and heating plate 122. After containment structure 130 is secured to heating plate 122 a negative pressure (such as a partial vacuum) is applied within void 132 at step 26 to remove any bubbles or other impurities within the amount of polymer 126 that formed during dispensing or curing of polymer 126. The negative pressure applied to the void is less than the negative pressure applied to the bottom surface of pre-laminated structure 120 (i.e., the release liner 118) to ensure that pre-laminated structure 120 is not lifted off of heating plate 122.

Subsequent to the application of the negative pressure after the amount of polymer 126 begins to gel, at step 28, the negative pressure is replaced with pressurized inert gas to prevent undesirable reactions caused by moisture or atmospheric reactive components within void 132 and heating plate 122 is heated. The inert gas is pressurized to reduce the size of any bubbles that remain within the amount of polymer 126 while the amount of polymer 126 is gelling. In addition, the synergistic combination of heat from heating plate 122 emitted to release liner 118 of pre-laminated structure 120 and pressurized inert gas applied within void 132 adheres the amount of polymer 126 to film layer 116. The synergistic combination of heat and pressurized gas also completes the lamination of metal layer 110 to film layer 116.

While the step of heating the heating plate is part of step 28 in FIG. 1, some embodiments may include the heating step occurring in or before step 26. In some embodiments, the heating step can occur after step 28.

Figure 7:
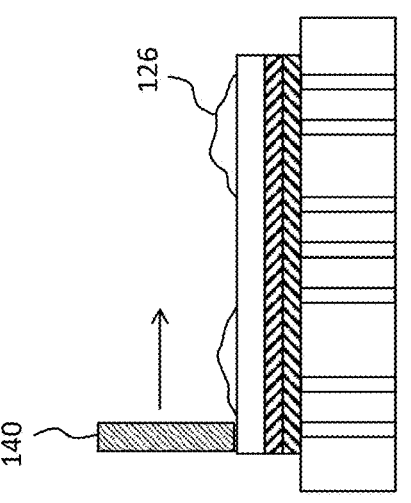
FIG. 7 is a section view of the metal core and heated platform of FIG. 3B and of a finishing edge, in accordance with an embodiment of the present invention.

After curing pre-laminated structure 120, void 132 is vented to the surrounding environment and containment structure 130 is removed from heating plate 122. In addition, pressure and gas are exhausted from pre-laminated structure 120 and heating plate 122 via the at least one channel 124 defined by heating plate 122. Next as described in step 30 of FIG. 1 and shown in FIG. 7, finishing edge 140 (such as a grinder a sander a milling machine or any other edge having a terminal point that is substantially parallel to a top surface of pre-laminated structure 120) is used to remove any excess cured polymer 126 that resides above the top surface of metal layer 110. In addition, since the entire top surface of metal layer 110 was not covered by polymer 126 with only apertures 112 being filled with polymer 126 the top surface of metal layer 110 can be used as a reference height for polymer 126 during the removal of excess polymer 126. Moreover, by using the top surface of metal layer 110 as a reference height for polymer 126 pre-laminated structure 120 includes a height that is smaller than laminated structures that are entirely covered with polymer 126 during curing.

Figure 8:
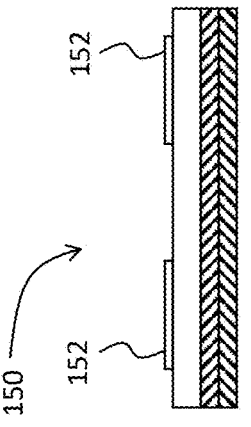
FIG. 8 depicts a coated metal core of an electronic payment card, in accordance with an embodiment of the present invention.

Furthermore, due to the targeted filling of apertures 112 with polymer 126 (as described above) a relatively small amount of excess polymer 126 is removed from pre-laminated structure 120 compared to processes which cover the entirety of metal layer 110 with polymer 126. Metal core 150 including polymer-filled apertures 152 as shown in FIG. 8. Each polymer-filled aperture 152 includes a height of approximately 0.00015 to approximately 0.0003 inches above the top surface of metal layer 110 to allow for compression of the cured polymer during any future laminations of the front surface of metal core 150 and prevent any noticeable indentations after future lamination of the front surface of the metal core 150. In some embodiments each polymer-filled aperture 152 is coplanar and flush with the top surface of metal core 150. In some embodiments, the finished height of the polymer extends above the top surface of the metal layer up to 0.001 inches.

Due to the targeted filling of apertures 112 with polymer 126 embodiments of metal core 150 include a higher composition percentage of metal compared to metal cores that include steps of coating an entire card surface and/or that include steps of using an extra coating or primer layer. The higher composition percentage of metal maximizes a weight of a card including metal core 150 while minimizing a thickness of the card. The higher composition percentage of metal also optimizes the tactile and audial properties associated with a card including metal core 150 as described above.

It should be appreciated that while the description above is directed to a method of interlaying a metal core for a single dual-layer electronic metal payment card, the method is repeatable for a plurality of dual-layer electronic metal payment cards. For example, a plurality of cards can be formed using the same sheet of material, and the method can be performed simultaneously for each card or sequentially for different cards on the sheet of material.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of interlaying a metal core for a dual-layer electronic metal payment card, the method comprising the steps of:
   providing layered structure comprised of a metal layer overlying a film layer, the metal layer having at least one aperture such that the film layer and the at least one aperture form a pocket;
   selectively filling the pocket with a polymer without coating an entire top surface of the metal layer, wherein an amount of the polymer is greater than a volume of the pocket;
   applying an amount of heat to the polymer, thereby curing the polymer; and
   removing an excess amount of polymer from the top surface of the metal layer, wherein the excess amount of polymer resides above the top surface of the metal layer, thereby forming a metal core with at least one filled aperture.

2. The method of claim 1, wherein removing the excess amount of polymer includes disposing a finishing edge proximate to the surface of the metal layer and laterally translating the finishing edge along the top surface of the metal layer.

3. The method of claim 1, wherein the excess amount of polymer extends between 0.00015 and 0.0003 inches above the top surface of the metal layer.

4. The method of claim 1, further comprising:
   placing the layered structure onto a heating plate, the heating plate defining at least one channel therethrough, wherein the at least one channel does not align with the at least one aperture in the metal layer;
   applying, through the at least one channel, a negative pressure to secure the layered structure to the heating plate.

5. The method of claim 4, further comprising applying a containment structure to the heating plate to seal the layered structure within a void defined by the heating plate and the containment structure and applying a negative pressure within the void thereby reducing bubbles formed within the polymer.

6. The method of claim 5, further comprising applying a pressurized inert gas within the void to further reduce a volume of bubbles formed within the polymer.

7. The method of claim 1, wherein the film layer is comprised of a heat activated cross-linking material.

8. The method of claim 1, wherein the film layer has a thickness of between approximately 0.0005 and 0.005 inches.

9. The method of claim 1, wherein the metal layer has a thickness of between approximately 0.005 and 0.030 inches.

10. A method of manufacturing a metal core for a dual-layer electronic metal payment card, the method comprising the steps of:
   providing pre-laminated structure comprised of a metal layer overlying a film layer, the metal layer having at least one aperture such that the film layer and the at least one aperture form a pocket;
   selectively filling the pocket with a polymer without coating an entire top surface of the metal layer, wherein an amount of the polymer is greater than a volume of the pocket;
   applying an amount of heat to the pre-laminated structure;
   removing an excess amount of polymer from the metal layer, wherein the excess amount of polymer resides above the top surface of the metal layer, thereby forming a metal core with at least one filled aperture.

11. The method of claim 10, wherein removing the excess amount of polymer includes disposing a finishing edge proximate to the surface of the metal layer and laterally translating the finishing edge along the top surface of the metal layer.

12. The method of claim 10, wherein the excess amount of polymer extends between 0.00015 and 0.0003 inches above the top surface of the metal layer.

13. The method of claim 10, further including:
   placing the pre-laminated structure onto a heating plate, the heating plate defining at least one channel therethrough, wherein the at least one channel does not align with the at least one aperture in the metal layer;
   applying a containment structure to seal the pre-laminated structure within a void defined by the heating plate and the containment structure;
   applying a negative pressure in the void to reduce bubbles formed in the polymer and applying a positive pressurized inert gas within the void to further reduce a volume of bubbles formed within the polymer.

14. The method of claim 10, wherein the film layer is comprised of a heat activated cross-linking material.

15. The method of claim 10, wherein the film layer has a thickness of between 0.0005 and 0.005 inches.

16. The method of claim 10, wherein the metal layer has a thickness of between approximately 0.005 and 0.030 inches.

17. A metal core for a dual-layer electronic metal payment card, comprising:
   a metal layer overlying a film layer;
   the metal layer including at least one aperture, such that the film layer and the at least one aperture form a pocket;
   a cured polymer disposed within the pocket and not about an entire top surface of the metal layer, wherein an amount of the polymer is greater than a volume of the pocket and an excess amount of polymer resides above the top surface of the metal layer.

18. The metal core of claim 17, wherein the film layer is comprised of a heat activated cross-linking material and has a thickness of between approximately 0.0005 and 0.005 inches.

19. The metal core of claim 17, wherein the excess amount of polymer extends between 0.00015 and 0.0003 inches above the top surface of the metal layer.

20. The metal core of claim 17, wherein the metal layer has a thickness of between approximately 0.005 and 0.030 inches.

* * * * *